US005333264A

United States Patent [19]

Tsutsumi

[11] Patent Number: 5,333,264

[45] Date of Patent: Jul. 26, 1994

[54] PICTURE DISPLAY APPARATUS FOR DISPLAYING FRINGED CHARACTERS ON AN IMAGE

[75] Inventor: Kunihiro Tsutsumi, Kawasaki, Japan

[73] Assignee: Rohm Co., Ltd., Kyoto, Japan

[21] Appl. No.: 895,639

[22] Filed: Jun. 9, 1992

[30] Foreign Application Priority Data

Jun. 14, 1991 [JP] Japan .......... 3-169275
Jun. 19, 1991 [JP] Japan .......... 3-174400
Jun. 26, 1991 [JP] Japan .......... 3-181764

[51] Int. Cl.[5] .......... G06F 15/20

[52] U.S. Cl. .......... 395/164; 395/150; 345/192; 345/194

[58] Field of Search .......... 395/150, 151, 162, 164–166; 340/750, 721, 732, 798–800; 345/185, 192, 193, 194, 200

[56] References Cited

U.S. PATENT DOCUMENTS 4,857,905 8/1989 Ogawa .......... 340/748

FOREIGN PATENT DOCUMENTS 124084 5/1988 Japan .
124891 5/1989 Japan .

*Primary Examiner*—Dale M. Shaw
*Assistant Examiner*—Kee M. Tung
*Attorney, Agent, or Firm*—Fay, Sharpe, Beall, Fagan, Minnich & McKee

[57] ABSTRACT

A picture display apparatus capable of displaying fringed characters is provided with a latch circuit for latching a character code read from a display data RAM. The latch circuit is provided between the display data RAM and a character generator and used to receive and hold the character code read from the display data RAM once and to supply the character code thus held to the character generator. A write circuit writes the character code to a memory when the latch circuit is not so timed as to receive the character code from the memory.

3 Claims, 5 Drawing Sheets

CHARACTER PATTERN AND FRINGING

TIMING TABLE

| TIME | T1 | T2 | T3 | T4 |
|---|---|---|---|---|
| | T0 | | | |
| ADDRESS SIGNAL U | READ ADDRESS "Q" | WRITE ADDRESS "A2" | WRITE ADDRESS "A3" | WRITE ADDRESS "A4" |
| ADDRESS SIGNAL L | – | "(N −1)" | "N" | "(N+1)" |
| CHARACTER SIGNAL W | – | "W2" | "W3" | "W4" |
| CHARACTER SIGNAL G | "G" | – | – | – |
| CHARACTER SIGNAL F | – | "G" | "G" | "G" |
| PATTERN SIGNAL P | – | PATTERN ON NO.(N-1) LINE | PATTERN ON NO. N LINE | PATTERN ON NO.(N-1) LINE |

PICTURE DISPLAY APPARATUS FOR DISPLAYING FRINGED CHARACTERS ON AN IMAGE

BACKGROUND OF THE INVENTION

1. Technical Field

The present invention relates generally to picture display apparatus and more particularly, to a picture display apparatus such as a CRT display, a so-called video movie camera (or a video camera) and an analog character display apparatus having the function of superimposing fringed characters or patterns on an image.

2. Background Art

FIG. 6 is a block diagram illustrating a display apparatus having character display functions, such as a video movie camera and an analog character display apparatus heretofore in use for displaying analog images and characters (hereinafter simply called "character display equipment"), mainly depicting the character image signal generating circuitry.

The character image signal generating circuit 13 is provided with a display data RAM 5 for storing all character codes to be displayed on a picture at a time.

In order to write a character code "W" supplied from a microcomputer 1 to the display data RAM 5, this circuit is provided with a write address register 2, a write data register 3, a write synchronizing circuit 4, and an address selecting circuit 6. The write address register 2 receives a control/data signal B from the microcomputer 1 and holds an address signal A therein. The write data register 3 holds the character code "W" and applies it as a character signal W. The write synchronizing circuit 4 generates a write synchronizing signal S according to the control signal of the control/data signal B. Further, the address selecting circuit 6 generates an address signal U directed to the display data RAM 5 on receiving the write signal S.

In order to read a display character code "G" from the display data RAM 5, the character image signal generating circuit 13 is provided with a vertical address counter 12, an oscillating circuit 11 and a horizontal address counter 10. The vertical address counter 12 generates a line selecting signal R for determining a vertical position on a display picture on receiving a vertical synchronizing signal V and a horizontal synchronizing signal H in synchronization with a scanning line, and applies the line selecting signal R to the address selecting circuit 6. The oscillating circuit 11 generates a so-called dot clock D on receiving the horizontal synchronizing signal H synchronous with the oscillation starting phase thereof and having a period corresponding to the horizontal scanning interval of each display dot on the display picture so as to obtain timing during the horizontal scanning. The horizontal address counter 10 generates a column selecting signal C on receiving the horizontal synchronizing signal H and the dot clock D for determining a horizontal position on the display picture and applies the column selecting signal C to the address selecting circuit 6 and the write synchronizing circuit 4.

In order to display a pattern of the character code "G" thus selected, the character image signal generating circuit 13 is further provided with a character generator 7 and a parallel/serial converter circuit 8 (hereinafter called a serial converter circuit 8). The character generator 7 generates a character pattern "P" equivalent to one line out of the pattern equivalent to one character on receiving an address signal L generated in the address selecting circuit 6 and the character code "G" on the character signal G. The serial converter circuit 8 sequentially outputs a character pattern having a plurality of bits equivalent to one line dot-by-dot through the dot clock D. That output is combined with another image signal E before being applied to CRT 9 on which a superimposed image is displayed.

The serial converter circuit 8 has a circuit for generating fringed patterns and also can combine the character pattern "P" having a fringed pattern "Y" with the image signal E to make CRT 9 display the combination.

Although the address selecting circuit 6 has been so defined since it selects either the address supplied from the outside or what is internally produced and gains access to the display data RAM 5, it functions as an access circuit with respect to the display data RAM 5 and the character generator 7.

A description will subsequently be given of the operation of the character image signal generating circuit 13 thus arranged when the character code "W" supplied from the microcomputer 1 is written to the display data RAM 5.

When the microcomputer 1 supplies a character code "W" to be written to the display data RAM 5 as its data to the write data register 3 according to the control/data signal B, the write data register 3 as a recipient holds the data as the character code "W" and then supplies the data onto the character signal W. When the microcomputer 1 supplies an address "A" in the display data RAM 5 to be written thereto as its data to the address register 2 according to the control/data signal B, the write address register 2 as a recipient holds the address "A" and supplies it onto the address signal A. When the microcomputer 1 communicates to the write synchronizing circuit 4 that the write address register 2 and the write data register 3 respectively hold the address signal A and the character code "W" in the form of a control signal according to the control/data signal B and ready for the write operation, the write synchronizing circuit 4 as a recipient tries to send out a write synchronizing signal S for effecting the write operation.

At this time, however, the write synchronizing circuit 4 outputs the write synchronizing signal S while avoiding the timing at which the character code "G" during a period of scanning an ineffective picture necessitating no character signal G is being read from the display data RAM 5, since the display character code "G" selected by the address signal U generated by the address selecting circuit 6 that has received the line selecting signal R and the column selecting signal C is read in synchronization with the horizontal synchronizing signal H and the vertical synchronizing signal V. The illustration of an input signal directed to the write synchronizing circuit 4 necessary for making the above-noted decision has been omitted in FIG. 3. On receiving the write synchronizing signal S, the address selecting circuit 6 selects the address signal A and supplies the address "A" on the address signal A to the display data RAM 5 as the address signal U together with the write signal, whereby the character code "W" is written to the address "A" in the display data RAM 5 on receiving the address signal U and the character signal W.

A description will subsequently be given of the operation of the circuit at the time the character code "G" to be displayed is selected and read from the display data RAM 5.

On receiving the vertical synchronizing signal V, the vertical address counter 12 initializes its count and on receiving the horizontal synchronizing signal H, counts up the value and outputs the line selecting signal R for determining the vertical position of a scanning line. On receiving the horizontal synchronizing signal H, the oscillation circuit 11 initializes the oscillation phase, and generates and outputs the dot clock D of a frequency corresponding to the horizontal scanning speed of the scanning line. On receiving the horizontal synchronizing signal H, the horizontal address counter 10 initializes its count and on receiving the dot clock D, counts up the value and outputs the column selecting signal C for determining the horizontal position of the scanning line. The address selecting circuit 6 receives the line address signal R and the column address signal C thus generated, generates the address signal U intended for the display data RAM 5 and the address signal L intended for the character generator 7 by subjecting these address signals to computation in conformity with the corresponding storage modes, and supplies the results to the display data DRAM 5 and the character generator 7, respectively.

On receiving the address signal U, the display data RAM 5 reads the character code "G" prestored at the address designated thereby and supplies it to the character generator 7 as the character signal G. The character generator 7 may be a ROM for storing character patterns, for instance. On receiving the character code "G" the character generator 7 selects a pattern (in a matrix configuration) equivalent to one character corresponding to the code and on further receiving the address signal L, outputs the character pattern "P" equivalent to one line in the pattern equivalent to the one character.

In order to generate a fringed pattern, patterns on upper and lower lines are needed, that is, patterns corresponding to three lines are required. Provided that the character pattern "P" to be displayed is indicated when the address signal L is "N" in value, the address signal L within the time required to scan one character width varies in value from "N−1" "N" to "N+1" and character patterns equivalent to three lines within a pattern equivalent to one character are sequentially read onto the pattern signal P (see FIG 2(a)).

Given a period to during which the address selecting circuit 6 supplied with the column selecting signal C horizontally scans a line equivalent in width to one character pattern in order to perform the operation as noted above, the period T0 is itself divided into four periods: T1, T2, T3, T4 (see Fi. 2(b)) and the address selecting circuit 6 operates in the respective periods as follows:

The address selecting circuit 6 applies a read address "Q" generated from the line selecting signal R and the column selecting signal C to the display data RAM 5 as the address signal U during the period T1, hereby the character code "G" stored at the address "Q" in the display data RAH 5 is read onto the character signal G.

The address selecting circuit 6 reads a character pattern on a line adjacent to the line "N" intended for scanning to generate the fringed pattern "Y" during the period T2. Then the address selecting circuit 6 applies "N−1" to the address signal L at this timing during this period. On receiving "N−1" and the character code "G" the character generator 7 reads a pattern on No. "N−1" line from the matrix pattern of the character code "G" as a character signal P.

As the character generator 7 is using the character code "G" during this period, the character code "G" read from the display data RAM 5 onto the character signal G needs to remain stable. Consequently, the address signal U as the input of the display data RAM 5 ought to be stable. Moreover, the address selecting circuit 6 generating the address signal U must apply the address "Q" onto the address signal U.

The character pattern "P" on the line "N" intended for scanning is read to generate the fringed pattern "Y" and to display the original character pattern "P" during the period T3. Then the address selecting circuit 6 applies "N" to the address signal L at this timing during this period. On receiving "N" and the character code "G" the character generator 7 reads a pattern on No. "N" line, that is, the character pattern "P" from the matrix pattern of the character code "G" as the character signal P.

As the character generator 7 is using the character code "G" even during this period, the character code "G" read from the display data RAM 5 onto the character signal G needs to remain stable. Consequently, the address signal U as the input of the display data RAM 5 ought to be stable. Moreover, the address selecting circuit 6 generating the address signal U must apply the address "Q" onto the address signal U.

The address selecting circuit 6 reads a character pattern on a line adjacent to the line "N" intended for scanning to generate the fringed pattern "Y" during the period T4. Then the address selecting circuit 6 applies "N+1" to the address signal L at this timing during this period. On receiving "N+1" and the character code "G" the character generator 7 reads a pattern on No. "N+1" line from the matrix pattern of the character code "G" as a character signal P.

As the character generator 7 is using the character code "G" also during this period, the character code "G" read from the display data RAM 5 onto the character signal G needs to remain stable. Consequently, the address signal U as the input of the display data RAM 5 ought to be stable. Moreover,.the address selecting circuit 6 generating the address signal U must apply the address "Q" onto the address signal U.

In other words, the address selecting circuit 6 generating the address signal U has to keep outputting the address "Q" in a stable condition until the period T0 is terminated after it has read the address "Q" onto the address signal U.

The serial converter circuit 8 has shift registers for converting parallel data to serial data and normally comprises a set of three shift registers as a principal unit in order to process character patterns equivalent to three lines necessary for generating the fringed pattern. This circuit operates to latch the character pattern "P" formed of a plurality of bits and character patterns adjacent thereto on both sides and outputs the character pattern "P" and the fringed pattern "Y" thus generated serially dot-by-dot on receiving the dot clock D.

The image signal generated in the character image signal generating circuit 13 and sequentially output dot-by-dot is superimposed by the apparatus on another image signal E before being displayed on CRT 9.

A description has been given of the character image signal generating circuit 13 of the prior art character display equipment as a specific example. A description will subsequently be given of the write synchronizing circuit 4.

The conventional character display equipment as disclosed in Japanese Laid-Open Pat. No. 124084/1988 and No. 124891/1989, is provided for the purpose of preventing a picture from flickering. More specifically, while the display data RAM 5 is outputting the character code "G" the character code on the character signal G becomes unstable when the address signal A for writing is selected and applied to the address signal U. The character pattern on the pattern signal P output from the character generator 7 as designated by the unstable character code tends to become unstable as well. As a result, because part of the pattern becomes what ought not be displayed, such undesirable flickering appears on the picture. Particularly in the case of the above-mentioned character display equipment capable of displaying fringed characters, the undesirable flickering tends to easily appear on the picture. In order to obviate such an inconvenience, the conventional write synchronizing circuit 4 in the equipment of this kind is designed to output the write synchronizing signal S only during the horizontal and vertical fly-back time of a scanning line (in a so-called ineffective picture period) where no data are read from the display data RAM 5.

However, data transfer speed and timing are restricted in the conventional character display equipment since the ineffective picture period is only utilized to write data to the display data RAM 5. Therefore, the problem is that the microcomputer is kept waiting as the updating of the display picture is slow. This problem is quite common to picture display apparatus such as video movie camera and analog character display equipment having the function of displaying fringed characters.

SUMMARY OF THE INVENTION

A picture display apparatus capable of displaying fringed characters according to the present invention comprises a memory, a character generator, and a write circuit for storing character codes and for writing the codes to the memory, wherein a latch circuit for latching a character code read from the memory is provided between the memory and the character generator, the latch circuit operating to receive and hold the character code read from the memory once before delivering the character code to the character generator, and wherein the write circuit operates to write the character code to the memory when the latch circuit is not so timed as to receive the character code from the memory.

More specifically, a code data latch for latching the character code is provided between a display data RAM and the character generator in the above-mentioned conventional circuit arrangement represented by the character image signal generating circuitry of the character display equipment and this code data latch receives and holds the character code read from the display data RAM once before delivering the character code to the character generator, whereas the write circuit outputs a write synchronizing signal on receiving a control signal from a microcomputer while the code latch is not to receiving the character code from the display data RAM.

With the arrangement above, unlike the conventional character display equipment, there exists timing at which data can be written to the display data RAM within the time each of the character patterns that can be present in plurality is displayed during the scanning of one line of an effective picture.

In other words, the character pattern is read a plurality of times to generate a fringed pattern during the time one character pattern width is scanned. If, however, attention is directed to the fact that the character codes applied to the character generator are the same during that period, data may be read from the display data RAM only once, on the condition that the character code read from the display data RAM is latched by the code data latch. While the character generator is reading out the character pattern on receiving the character code from the code data latch, the output of the display data RAM may be anything. Therefore, no undesirable flicker will appear on the picture as long as data are written to the display data RAM at this timing.

The operation of the circuit at this time will be described in detail. Data are read from the display data RAM once at the beginning of a period (T0) (i.e., a period T1) during which one character pattern width is scanned. More specifically, an address selecting circuit supplies to the display data RAM an address signal derived from a line selecting signal R and a column selecting signal C and on receiving the address signal, the display data RAM outputs the character code designated thereby. The code data latch holds the character code.

During the period of scanning the one character pattern width, data reading from the character generator for character fringing is carried out a plurality of times (normally three times), the character fringing being carried out during the periods (i.e., T2, T3, T4) of data reading from the character generator after the period (i.e., T1) of data reading from the display data RAM. At this time, the character code received by the character generator needs to remain stable.

In the circuit according to the present invention, the character code received by the character generator is not output from the display data RAM directly and continuously but held by the code data latch. The character code received by the character generator remains stable even though the output of the display data RAM is unstable during that time. Consequently, the character pattern is prevented from falling into disorder, thus causing no undesirable flickering to appear on the picture.

Therefore, the write synchronizing circuit outputs the write synchronizing signal on receiving the control signal from the microcomputer during the period of data reading from the character generator in addition to during the period of scanning the ineffective picture, so that data can be written to the display data RAM. As a result, it is unnecessary for the microcomputer to wait for a long period of time in order to transfer data. As data can be transferred efficiently, a picture can quickly be updated.

Incidentally, not only sign codes prescribed by JIS and ASCII codes but also color and blink information may be added to the character codes.

It is therefore an object of the present invention to provide a picture display apparatus such as a video movie camera and an analog character display apparatus having the function of displaying a fringed character such that the flicker of a display image is reducible.

It is another object of the present invention to provide a picture display apparatus having the function of displaying a fringed character such that a display picture is quickly updated, and that the wait time for a controller such as a microcomputer for controlling display is kept to a minimum.

It is still another object of the present invention to provide a picture display apparatus capable of speedily displaying a fringed character free from flickering.

It is a further object of the present invention to provided a picture display apparatus having the function of displaying a fringed character such that it is capable of reducing not only the flicker of a display image but also power consumption.

BRIEF DESCRIPTION OF THE DRAWINGS

FIG. 2(*b*) is a timing illustrating signal-to-signal relations around a code data latch featuring character display according to the present invention.

DESCRIPTION OF THE PREFERRED EMBODIMENT

Figure 1:
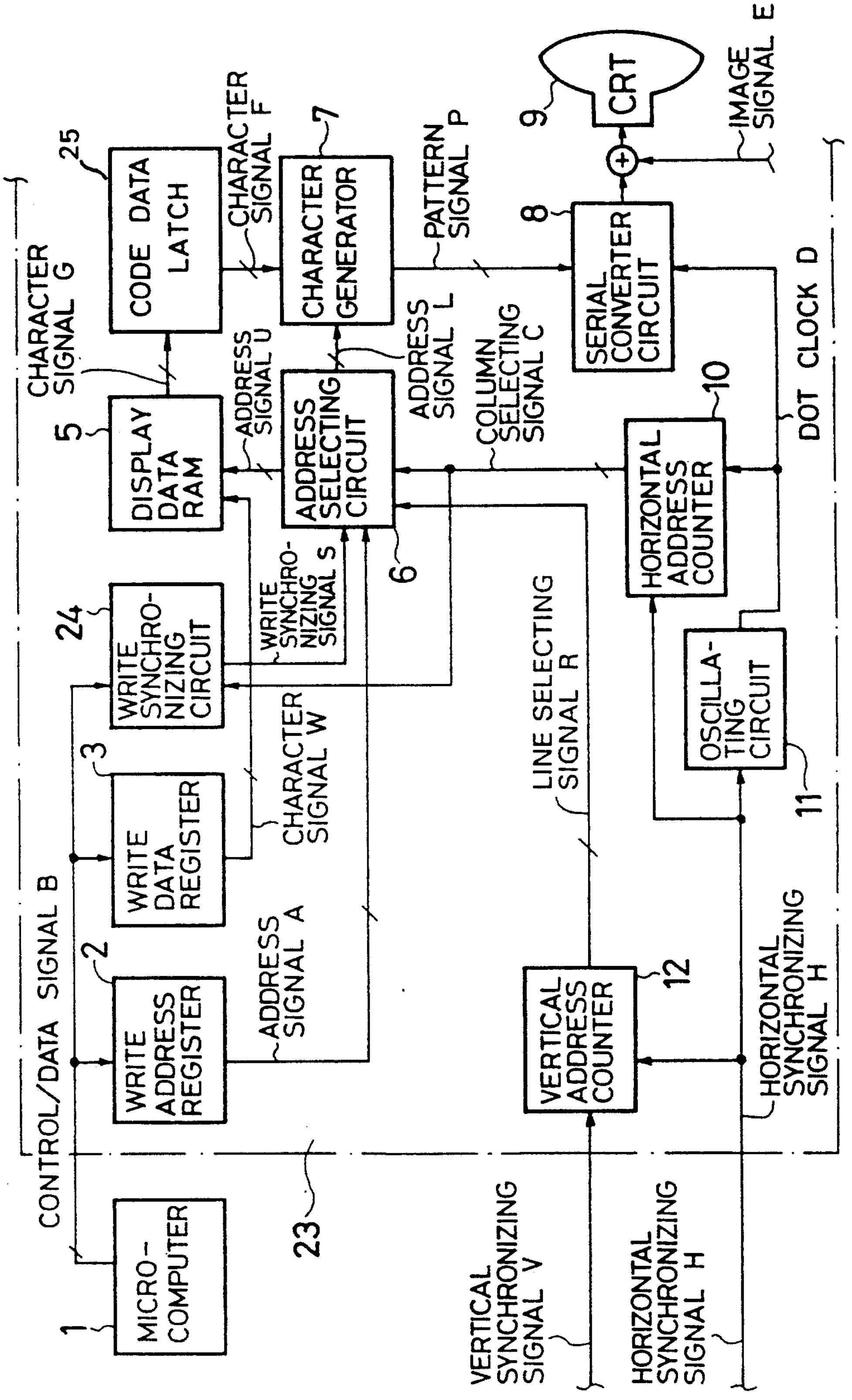
FIG. 1 is a block diagram of a picture display apparatus embodying the present invention, mainly depicting its character image signal generating circuitry.
Figure 6:
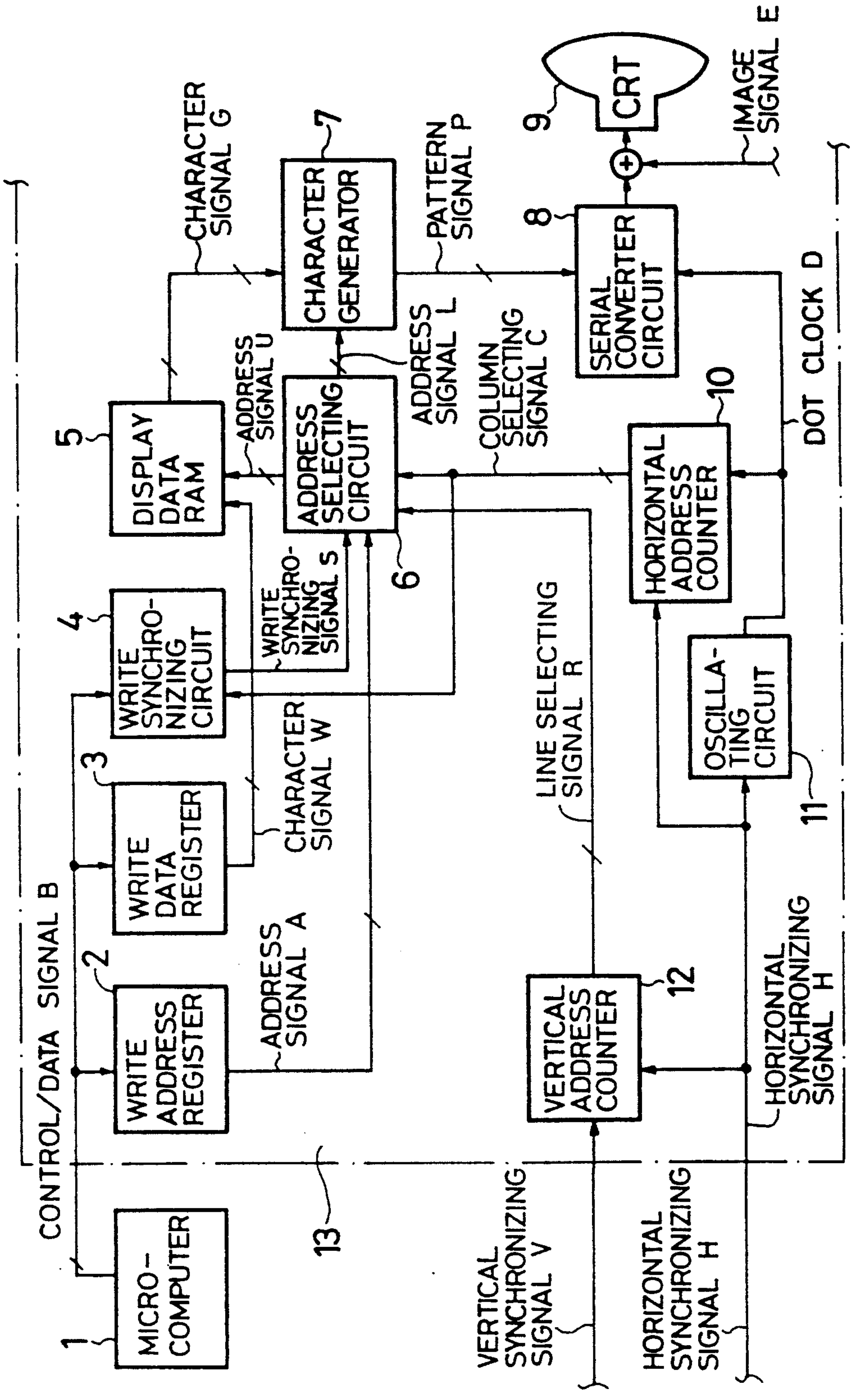
FIG.6 PRIOR ART
FIG. 6 is a block diagram of conventional character display equipment, mainly depicting its character image signal generating circuitry.

FIG. 1 is a block diagram of picture display equipment embodying the present invention, mainly depicting its character image signal generating circuitry The configuration of the character display equipment in this embodiment is different from what is shown in FIG. 6 in that a code data latch 25 is newly provided while a write synchronizing circuit 24 is an improved version of the write synchronizing circuit 4 of FIG. 6. The code data latch 25 receives and holds a character code "G" on a character signal G read from a display data RAM 5 and applies the character code "G" to a character generator 7 as a character signal F. After receiving a column selecting signal C from a horizontal address counter, the write synchronizing circuit 24 outputs a write synchronizing signal S on receiving a control signal from a microcomputer 1 according to its control/data signal B, on the condition that the code data latch 25 has not received the character signal G, that is, it has not yet been activated (T2, T3, T4 as noted previously).

Figures 2A, 2B:
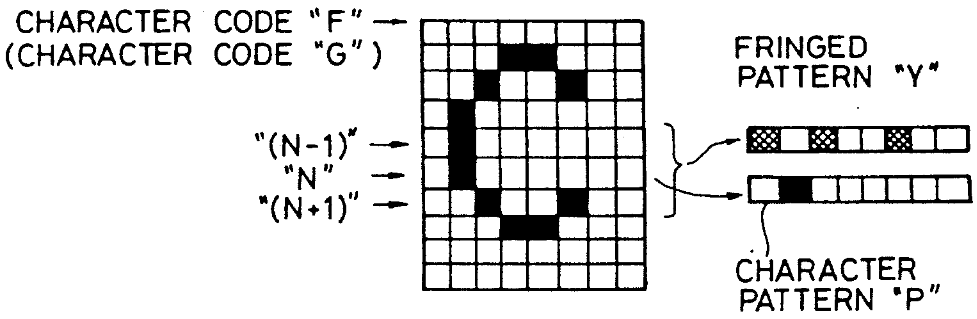
FIG. 2(*a*) is a diagram illustrating a character pattern in character display featuring a picture display apparatus embodying the present invention, and an exemplary fringe pattern surrounding vertical and horizontal dots.

Referring to the timing table of FIG. 2, a detailed description will be given of the feasibility of data writing to the display data RAM 5 during the period of displaying each character pattern with the arrangement above.

As in the case of the conventional character display equipment, the period of scanning one character pattern width is given as T0 and the period T0 is itself divided into four periods: T1, T2, T3, T4.

The address selecting circuit 6 applies a read address "Q" generated from a line selecting signal R and a column selecting signal C to the display data RAM 5 as an address signal U during the period T1, whereby the character code "G" stored at the address "Q" in the display data RAM 5 is read onto the character signal G. The code data latch 25 receives one bit of the column selecting signal C as a clock signal, then receives and holds the character code "G" to execute the output of display data RAM 5.

The code data latch 25 in place of the display data RAM 5 outputs the character code "G" held thereby as the character signal F during the period T2. As it is necessary to read a character pattern on a line adjacent to the line "N" intended for scanning to generate a fringed pattern "Y" the address selecting circuit 6 applies "N−1" to an address signal L at this timing during this period On receiving "N−1" the character generator 7 reads a character pattern on No. "N−1" line from the matrix pattern of one character of the character code "G" as a pattern signal P.

As the display data RAM 5 is not restricted during this period, the write synchronizing circuit 24 outputs a write synchronizing signal S on receiving the control signal from the microcomputer 1 according to its control/data signal B. Then the address selecting circuit 6 selects an address "A2" on an address signal A as the address signal U on receiving the signal S during the timing period T2 and outputs the address "A2" together with the write signal, whereby a character code "W2" on a character signal W is written to the display data RAM 5.

The code data latch 25 in place of the display data RAM 5 outputs the character code "G" held thereby as the character signal during the period T3 as well. The address selecting circuit 6 applies "N" to the address signal L during this period. On receiving "N" the character generator 7 reads a character pattern "P" on No. "N" line from the matrix pattern of one character of the character code "G" as the pattern signal P.

As the display data RAM 5 is not restricted also during this period, the write synchronizing circuit 24 outputs write synchronizing signal S on receiving the control signal from the microcomputer 1 according to its control/data signal B. Then the address selecting circuit 6 selects an address "A3" on the address signal A as the address signal U on receiving the signal S during the timing period T3 and outputs the address "A3" together with the write signal, whereby a character code "W3" on the character signal W is written to the display data RAM 5.

The code data latch 25 in place of the display data RAM 5 outputs the character code "G" held thereby as the character signal F also during the period T4. As it is necessary to read a character pattern on a line adjacent to the line "N" intended for scanning to generate a fringed pattern "Y" the address selecting circuit 6 applies "N+1" to an address signal L at this timing during this period. On receiving "N+1" the character generator 7 reads a character pattern on No. "N+1" line from the matrix pattern of one character of the character code "G" as the pattern signal P.

As the display data RAM 5 is also not restricted during this period, the write synchronizing circuit 24 outputs write synchronizing signal S on receiving the control signal from the microcomputer 1 according to its control/data signal B. Then the address selecting circuit 6 selects an address "A4" on the address signal A as the address signal U on receiving the signal S during the timing period T4 and outputs the address "A4" together with the write signal, whereby a character code "W4" on the character signal W is written to the display data RAM 5.

In this way, the character code "G" received by the character generator is not kept outputting directly by the display data RAM 5 but held and output by the code data latch 25 instead in the circuit of the present invention. Consequently, the character code "G" on the character signal F received by the character generator remains stable even though the output of the display data RAM 5 is unstable then and the picture is prevented from flickering.

It is therefore possible to write data from the microcomputer 1 to the display data RAM 5 during the periods T2, T3, T4 of data reading from the character generator, that is, about ¾ period of time, even during the period of scanning an effective picture in addition to that of scanning a so-called ineffective picture during horizontal and vertical fly-back time of a scanning line. In this case, the code data latch 25 receives one bit of the column selecting signal C as the clock signal and further receives and holds the character code "G" only during the read period T1 as an operating period.

Although a description has been given of writing during the period of scanning the effective picture featuring the present invention, the description of other operations including the outputting of the write synchronizing signal S during the period of scanning the ineffective picture will be omitted as they are similar to those in the prior art example.

Since the present invention features the utilization of the period of data reading required to generate a fringed pattern, it can be applicable to not only character image signal generating circuits of display apparatus designed for characters alone, but also those of image display apparatus such as televisions, VTRs, video cameras and laser discs for superimposing fringed characters, titles and the like.

As set forth above, the image display apparatus for displaying characters according to the present invention permits data from the microcomputer to be written to the display data RAM without the flickering of the picture, merely by the addition of a simple circuit. Data can thus be transferred without causing the microcomputer to be kept waiting, and thus the microcomputer is simultaneously updated quickly. High-speed fringe display is also made possible.

As will readily be understood from the description given above, high-speed character-to-character display is made possible in the embodiment of FIG. 1. In other words, fringing can be implemented at high speed on a character basis instead of a line basis.

Figure 3:
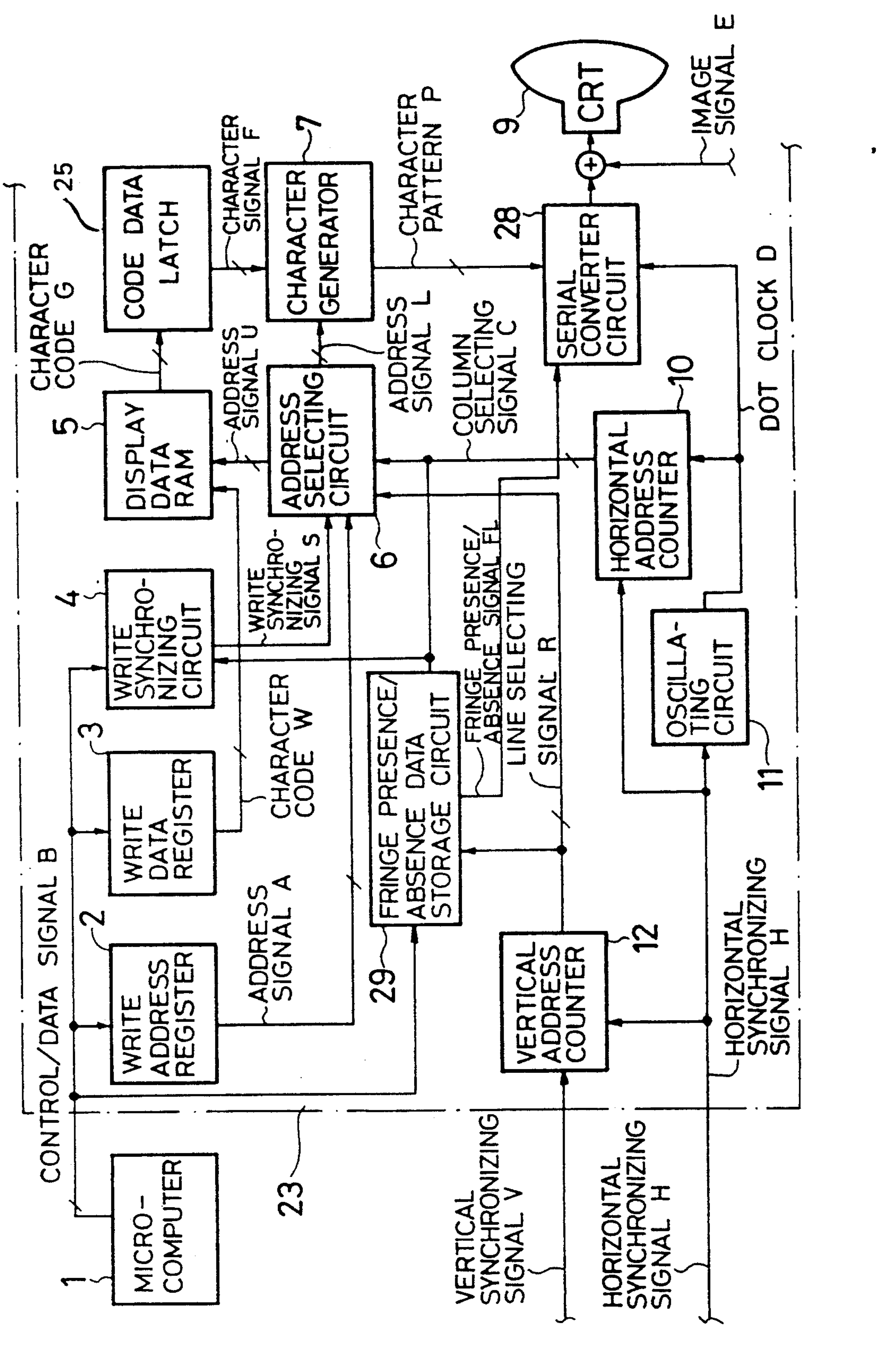
FIG. 3 is a block diagram of a picture display apparatus embodying the present invention, mainly depicting its character image signal generating circuitry.

FIG. 3 illustrates an embodiment in which a fringed character is displayed at higher speed, fringing being implemented on a character basis, and the character is made emphasizable. In this case, a fringe presence/absence data storage circuit 29 is additionally provided to the embodiment of FIG. 1.

The fringe presence/absence data storage circuit 29 can store a flag of one picture indicating the presence or absence of a fringe corresponding to each character on receiving flag data from the microcomputer 1. On receiving a line selecting signal R from a vertical address counter 12 and a column selecting signal C from a horizontal address counter 10, this circuit stores the flag data of one picture at the address determined by these signals. Further, the flag data are sequentially supplied from this circuit to a parallel/serial converter circuit 28 (hereinafter called "serial converter circuit 28"). The serial converter circuit 28 is provided in substitution for the serial converter circuit 8, the difference therebetween being that the former operates to apply to CRT 9 a signal incorporating a fringe signal corresponding to a character in response to a signal from the fringe presence/absence data storage circuit 29 or a fringe absence output signal.

Figure 4:
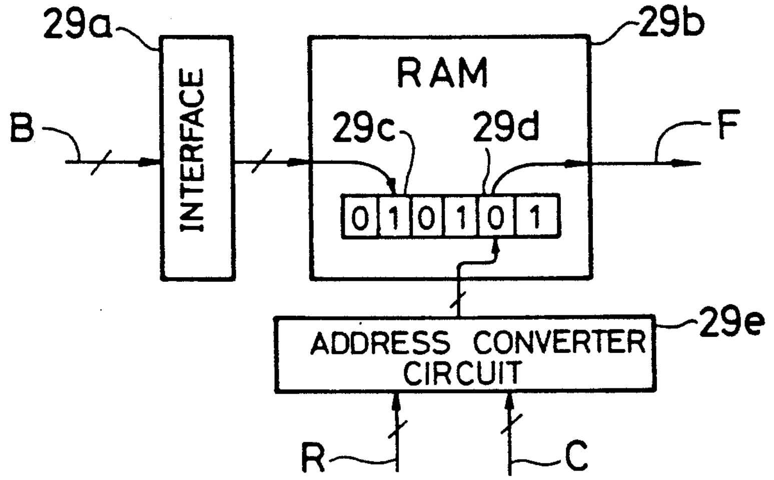
FIG. 4 is a detailed block diagram of a storage circuit for storing data indicating the presence or absence of a fringe featuring the picture display apparatus of FIG. 3.

FIG. 4 illustrates a specific exemplary fringe presence/absence data storage circuit 29. This circuit comprises RAM **29*b* as a main component, an interface 29*a* with the microcomputer and an address converter circuit 29*e***.

A dual port memory is used for R **29*b* and its write-side address port is connected to the interface 29*a*. Moreover, the interface 29*a* is connected via a control/-data signal B to the microcomputer 1. Consequently, the microcomputer 1 sends the control signal, an address and data via the control/data signal B to the interface 29*a*, , whereas the interface 29*a* gains access to RAM 29*b*. The value of a designated flag 29*c* among those stored in RAM 29*b* can be changed accordingly. Therefore, the value of a flag corresponding to the position of a character pattern desired to be emphasized with a fringe to be displayed on a picture may be set at "1" whereas the value of a flag corresponding to the position of a character pattern not desired to be emphasized and consequently without a fringe to be displayed on a picture may be set at "0". The flag of the fringe presence/absence data storage circuit 29** is set at "0" when it is in an initial state or reset.

The read-side address port of RAM **29*b* is connected to the address converter circuit 29*e*. Moreover, the address converter circuit 29*e* receives the line selecting signal R and the column selecting signal C. In this case, the address converter circuit 29*e* generates the address of a flag indicating the presence or absence of a fringe corresponding to a display character, that is, an address directed to RAM 29*b*, on receiving the line selecting signal R for determining the vertical position and the column selecting signal C for determining the horizontal position. The value "0" or "1" of a flag 29*d*** designated by this address is read from the data output and output as a fringe presence/absence signal FL.

The fringe presence/absence selecting signal FL generated by the fringe presence/absence data storage circuit 29 is transmitted to the serial converter circuit 28. The serial converter circuit 28 selects either display Z with a fringe or display N without a fringe and outputs the result in accordance with the value "1" or "0" of the fringe presence/absence selecting signal FL. As a result, it is possible to effect display selectively with a fringe for emphasis or without a fringe.

The fringe presence/absence data storage circuit 29 described above refers to a case where the dual port memory is used. A description will subsequently be given of a different circuit arrangement that is also feasible.

When an ordinary RAM is used for the memory, it is only necessary to provide the interface **29*a*, the address converter circuit 29*e* and an additional circuit equivalent to the address selecting circuit 6. With this arrangement, its function is similar to that of the circuit of FIG. 4 except that data writing to RAM 29*b* from the microcomputer 1** is restricted while the fringe presence/absence selecting signal FL is being output.

When the display position of the character to be fringed is prefixed, the memory may be a ROM. As no data writing is required in this case, the ROM and the address converter circuit 29*e* may constitute the circuit with the omission of the interface 29*a*. With this arrangement, its function is similar to that of the circuit of FIG. 4 except that the flag indicating the presence or absence of a fringe is not dynamically varied.

On condition that the display position of the character on the picture is determined in such a way that the values of the line selecting signal R and the column selecting signal C correspond to a multiple of the second power of 2, the address converter circuit 29*e* may be omitted by connecting bits of the line selecting signal R and the column selecting signal C to RAM or the address input terminal of the ROM partially and directly. Even in this case, its function is also similar to that of the above-mentioned circuit.

When only one designated line is to be controlled, moreover, the fringe control circuit comprises an address register for receiving and holding the address according to the control/data signal B from the microcomputer, and a comparator for comparing the address output from the register with the value of the line selecting signal R to output the result as the fringe presence/absence signal FL.

Notwithstanding, the application of such a picture processing apparatus to a portable video movie camera still poses a problem in power consumption because equipment of this sort is normally supplied with power from a battery and desired to operate for hours. Consequently, the above-mentioned image display circuit for use in displaying characters is designed as a low power consumption type using a number of CMOS circuits. It is therefore undesirable to provide the circuit with the code data latch circuit 25 and the fringe presence/absence data storage circuit 29 as the power consumption of such a portable video movie increases. A description will subsequently be given of a circuit for reducing power consumption in the equipment of that sort as a further embodiment of the present invention.

Figure 5:
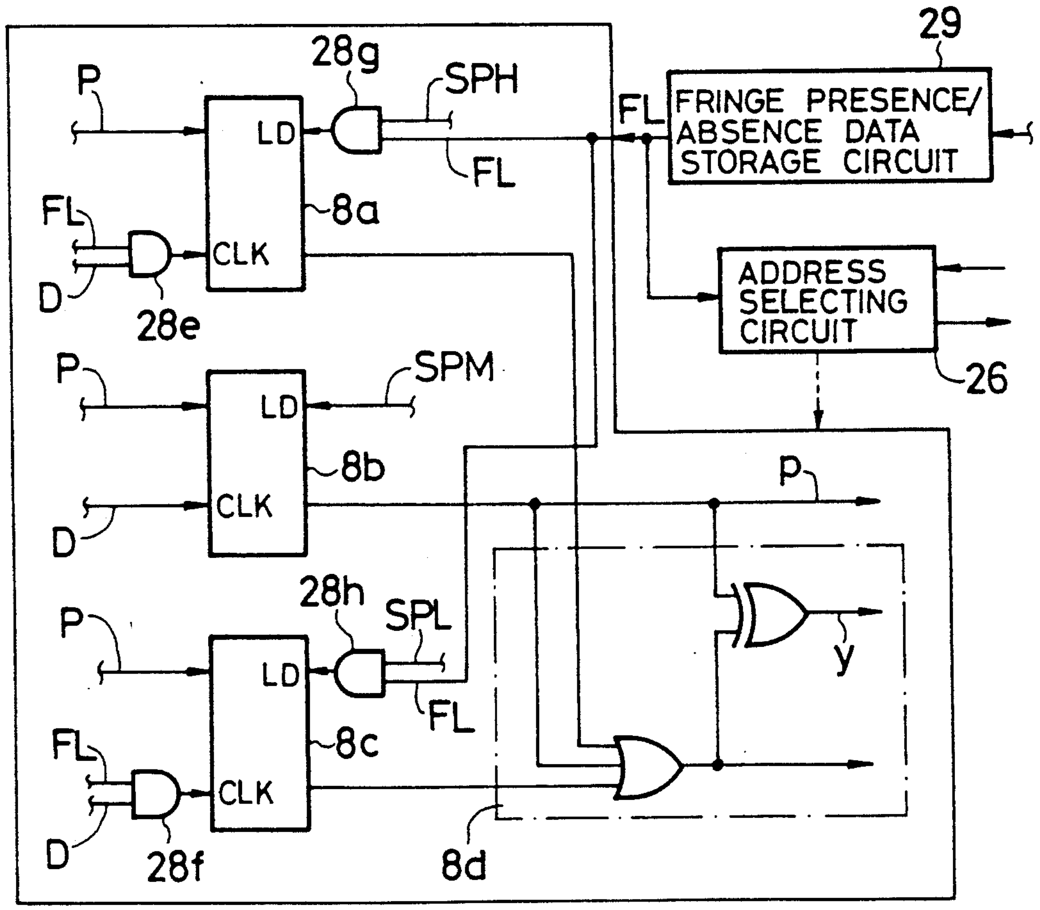
FIG. 5 is a block diagram of still another picture display apparatus embodying the present invention, mainly depicting its serial converter circuit.

FIG. 5 is a block diagram of a specifically arranged serial converter circuit 28 for implementing low power consumption in place of the serial converter circuit 28 of FIG. 3. In order to reduce power consumption, the fringe presence/absence signal FL is also applied from the fringe presence/absence data storage circuit 29 to the address selecting circuit 6 in this embodiment. The address selecting circuit in this case will be described as an address selecting circuit 26 of FIG. 5. While the fringe presence/absence signal FL is in the state of fringe absence, the address selecting circuit 26 does not vary the value of the address signal L for gaining access to the character generator 7 from "N−1" to "N" and to "N+1;" that is, the character generator 7 is not accessed three times. At this time, the value of the address signal L to be generated is only "N" and used for gaining access once, whereby the power consumption is reduced as the number of access operations in the circuit of the CMOS configuration decreases.

The serial converter circuit 28 comprises three shift registers 8*a*, 8*b*, 8*c* for respectively receiving 10 the character pattern "P" in parallel. The input terminal LD of the shift register 8*b* to be supplied with a load signal directly receives a set signal SPM as a character pattern load signal as before. However, the input terminals LD of the shift registers 8*a*, 8*c* do not directly receive set signals SPH, SPL but receive the outputs of respective gates 28*g*, 28*h*. In this case, the set signals SPM, SPH, SPL are set pulses respectively representing MIDDLE, HIGH; LOW positions and the shift registers 8*a*, 8*b*, 8*c* are loaded with the character pattern "P" at the timing of generating the respective signals.

The set signal SPH is a signal indicating the timing of receiving the output of the character generator 7 when the address selecting circuit 26 gains access to the N−1 line of the character pattern. Similarly, the set signals SPM, SPL are signals indicating the timing of receiving the output of the character generator 7 when the address selecting circuit 26 gains access to the N and N−1 lines of the character pattern, respectively. These set signals are generated in the serial converter circuit 28 in response to the generation of the address signal L in the address selecting circuit 26 or otherwise by receiving the timing signal (shown by a dotted line) from the address selecting circuit 26 and decoding it.

The gate 28*g* receives the set signal SPH at one input terminal, whereas the gate 28*h* receives the set signal SPL at one input terminal and the fringe presence/absence signal FL at the other terminal from the fringe presence/absence data storage circuit 29. Then these signal values are ANDed, whereby the shift registers 8*a*, 8*c* are supplied by the fringe presence/absence signal FL with masking set signals at their input terminals LD.

Further, the input terminal CLK of the shift register 8*b* directly receives the dot clock D as usual. However, the input terminals CLK of the shift registers 8*a*, 8*c* do not directly receive the dot clock D but receive the outputs of the gate 28*e*, 28*f*. The gates 28*e*, 28*f* receive the dot clock D at their one input terminals and the fringe presence/absence signal FL at the other terminals. Then these signal values are ANDed, whereby the shift registers 8*a*, 8*c* are supplied by the fringe presence/absence signal FL with masking set signals at their input terminals CLK (see FIG. 5).

The respective outputs of the shift registers 8*a*, 8*b*, 8*c* are input to a fringe signal generating circuit 8*d* where a signal of a fringed pattern "Y" and this signal is applied to CRT 9. Moreover, the output of the shift register 8*b* is applied to CRT 9 as a signal p of the character pattern "P".

With this arrangement, the supply of the set 30 signals SPH, SPL and the dot clock D to the shift registers 8*a*, 8*c* is suspended as they are masked by the fringe presence/absence signal FL when fringing is not implemented. Consequently, two out of the three sets of shift registers are not switched, with the effect of reducing power consumption in the serial converter circuit.

The operation will briefly be described as follows. When the address selecting circuit 26 is instructed not to effect fringing on receiving the fringe presence/absence signal FL, it does not generate addresses "N−1" "N+1" on adjoining lines. Only address "N" is applied onto the address signal L during the period T0. Therefore, the address selecting circuit 26 applies the read address "Q" read from the line selecting signal R and the column selecting signal C to the code data latch 25 as the address signal U, whereby the character code "G" stored at the address "Q" of the display data RAM 5 is read.

The address selecting circuit 26 applies "N" to the address signal L during the period T2. On receiving "N" and the character code "G", the character generator 7 reads the character pattern "P" on No. "N" line from the matrix pattern of the character code "G". Since the set signal SPH is masked by the fringe presence/absence signal FL, however, the character pattern "P" will never be received by the shift register 8*a* of the serial converter circuit 28.

The address selecting circuit 26 keeps applying "N" to the address signal L during the period T3. Therefore, the character generator 7 also keeps outputting the character pattern "P". Then only the character pattern "P" is received by the shift register 8*b* of the serial converter circuit 28 in response to the set signal SPM and used to output an image.

The address selecting circuit 26 keeps applying "N" to the address signal L even during the period T4. Therefore, the character generator 7 also keeps outputting the character pattern "P". As the set signal SPL has been masked by the fringe presence/absence signal FL, however, the character pattern "P" is not also received by the shift register 8*c* of the serial converter circuit 28.

In this way, the address selecting circuit in the character image signal generating circuit generates the address signal directed to the character generator only once during the predetermined period when the character is not fringed by the fringe presence/absence signal. Consequently, the control circuit for controlling the address decoder, the output buffer and the like in the character generator receiving the address signal operates only once. As the switching frequency is reduced to ⅓ even in the character generator, the power consumption also decreases to about ⅓.

Although the fringe presence/absence data storage circuit is provided in the embodiment of FIG. 3, the fringe presence/absence data may be generated directly by the microcomputer before being delivered to the serial converter circuit or the address selecting circuit.

The period of horizontally scanning the line equivalent in width to one character pattern is given as T0 and the period T0 is divided into four in the embodiment shown: namely, T1, T2, T3, T4. With respect to the periods resulting from the division, the address selecting circuit is adapted to reading data from the display data RAM during the initial period T1. Since the address selecting circuit has two systems of gaining access to the display data RAM and the character generator, it may be adapted to read subsequent data from the display RAM during the last period T4 without reading the subsequent data during the next period T0 following the last period T4 as in the case of so-called pipeline control. It is therefore possible to control simultaneously the next period T1 together with the preceding last period T4.

Although the picture display apparatus with a self-contained microcomputer has been described by way of example in the embodiment shown, the microcomputer may be any control unit.

What is claimed is:

1. A picture display apparatus comprising:

a first address register for receiving, holding and then outputting a first address signal, a first data register for receiving, holding and then outputting a first character code, a vertical address counter for generating a line selecting signal for determining a vertical position on a display medium of a display apparatus on receiving a vertical synchronizing signal, a horizontal address counter for generating a column selecting signal for determining a horizontal position on the display medium on receiving a horizontal synchronizing signal, an oscillating circuit for generating a clock signal having a period corresponding to a scanning time of each display dot on said display medium on receiving said horizontal synchronizing signal, the oscillation starting phase being synchronized with said horizontal synchronizing signal, an access circuit for generating a second and a third address signal on receiving said line selecting signal, said column selecting signal and said first address signal, a display data RAM for receiving the second address signal from said access circuit and for storing an entire character code intended for display in order to output a second character code stored at the address designated by the second address signal, a character generator for selecting a matrix pattern equivalent to one character on receiving the second character code correspondingly and outputting a pattern equivalent to a corresponding line from said matrix pattern on receiving the third address signal, a parallel/serial converter circuit for receiving a plurality of character patterns necessary for generating a fringed pattern in parallel to hold the plurality of character patterns, and for outputting one of a character pattern and a fringed character pattern sequentially dot by dot per clock signal, a latch circuit holding and outputting the corresponding character code on receiving the second character code from said display data RAM, a write synchronizing circuit for applying a write synchronizing signal to said access circuit when said access circuit writes said second character code to said display data RAM on receiving a control signal and said column selecting signal, wherein said access circuit selects the first address signal on receiving said write synchronizing signal, and outputs the first address signal as the second address signal, so that said display data RAM stores the first character code at the address designated by the second address signal as the second character code, said character generator receiving the corresponding character code from said latch circuit, said write synchronizing circuit outputting said write synchronizing signal on receiving the control signal and before said latch circuit receives the second character code from said display data RAM, and said access circuit writing the first character code to said display data RAM, and a fringe presence/absence data storage circuit for holding a flag indicating the presence or absence of a fringe on a character or line basis, wherein said fringe presence/absence data storage circuit receives said line selecting signal and said column selecting signal and applies the flag held at the address designated by these signals to said parallel/serial converter circuit in the form of a fringe presence/absence signal, and said parallel/serial converter circuit selects and outputs either fringe presence or absence display according to said fringe presence/absence signal.

2. A picture display apparatus, comprising:

an access circuit for generating a first address signal once and a different address as a second address signal three times during a scanning period equivalent in width to one character on receiving a line selecting signal for determining a vertical position and a column selecting signal for determining a horizontal position on a display picture, a display data RAM for storing an entire displayed character code and for reading and outputting a character code stored at the address designated by the first address signal, a latch circuit for latching said character code read from said display data RAM, a character generator for selecting a matrix pattern equivalent to a corresponding character on receiving said character code from said latch circuit and for outputting a character pattern corresponding to one character pattern from said matrix pattern on receiving the second address signal, a serial converter circuit for causing at least a set of three shift registers to receive and hold a set of three character patterns correspondingly obtained by generating the second address signal required to generate a fringed pattern three times and for outputting said set of character patterns sequentially dot by dot per clock signal having a period corresponding to the period of scanning each display dot on said display picture, wherein the different address as the second address signal is a continuous address, and said access circuit generates the first address signal once and subsequently the second address signal three times, and a microcomputer, wherein said access circuit comprises a CMOS circuit and fixes adding and subtracting values for the generation of the second address signal when instructed to add no fringe on receiving a fringe presence/absence signal from said microcomputer so as to generate the second address signal only once, said serial converter circuit suspending the operation of two out of said three shift registers on receiving said fringe presence/absence signal in a fringe absence state, and said access circuit, said display data RAM, said latch circuit, said character generator, said parallel/-serial converter circuit and each circuit of said microcomputer being incorporated in either a video movie camera or a video camera.

3. A picture display apparatus as claimed in claim 2, further comprising a fringe presence/absence data storage circuit, wherein said fringe presence/absence data storage circuit receives and stores fringe presence/absence data from said microcomputer and generates said fringe presence/absence signal on receiving said clock signal.

* * * * *